(12) United States Patent
Bagwell et al.

(10) Patent No.: US 9,235,449 B1
(45) Date of Patent: Jan. 12, 2016

(54) SYSTEMS AND METHODS FOR REDUCING CONTENTION FOR A SOFTWARE QUEUE IN A NETWORK ELEMENT

(75) Inventors: Coleman D. Bagwell, Madison, AL (US); Brent Christopher Priddy, Harvest, AL (US); Walter Martin Steverson, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 520 days.

(21) Appl. No.: 13/531,235

(22) Filed: Jun. 22, 2012

(51) Int. Cl.
*H04L 12/28* (2006.01)
*G06F 9/52* (2006.01)
*H04L 12/54* (2013.01)

(52) U.S. Cl.
CPC . *G06F 9/52* (2013.01); *H04L 12/28* (2013.01); *H04L 12/56* (2013.01)

(58) Field of Classification Search
CPC .......................................................... G06F 9/52
USPC ........................................................ 370/412
See application file for complete search history.

(56) References Cited

U.S. PATENT DOCUMENTS

| | | | |
|---|---|---|---|
| 5,301,274 A * | 4/1994 | Li | 709/234 |
| 5,740,448 A | 4/1998 | Gentry et al. | |
| 6,128,672 A | 10/2000 | Lindsley | |
| 6,430,593 B1 | 8/2002 | Lindsley | |
| 6,977,895 B1 | 12/2005 | Shi et al. | |
| 7,395,356 B2 | 7/2008 | Ma et al. | |
| 7,706,275 B2 | 4/2010 | Archer et al. | |
| 2002/0016879 A1 | 2/2002 | Miller | |
| 2003/0208521 A1 * | 11/2003 | Brenner et al. | 709/103 |
| 2005/0094559 A1 * | 5/2005 | Ma et al. | 370/229 |
| 2005/0128945 A1 * | 6/2005 | Kuo et al. | 370/230 |

OTHER PUBLICATIONS

Yuanming et al. (Clustered software queue for efficient pipelined multithreading, IEEE, 2009 pp. 116-123).*

* cited by examiner

*Primary Examiner* — Maharishi Khirodhar
(74) *Attorney, Agent, or Firm* — Maynard Cooper & Gale, P.C.; Jon E. Holland (57) ABSTRACT

A network element has at least one receiver, a software queue, and at least one transmitter. A data path thread moves data packets from a receive queue of the receiver to the software queue, and a transmit driver moves data packets from the software queue to a transmit queue of the transmitter. A flow indicator associated with the software queue is controlled to indicate when at least one data packet remains in the software queue. A queue management thread polls the flow indicator to determine when the software queue should be accessed for ensuring that data packets do not remain in the software queue for extended time periods between data bursts.

19 Claims, 4 Drawing Sheets

SYSTEMS AND METHODS FOR REDUCING CONTENTION FOR A SOFTWARE QUEUE IN A NETWORK ELEMENT

RELATED ART

Network elements, such as, for example, gateways, routers, and switches, receive data packets and forward the packets to other elements in a network. Data packets are often communicated in bursts rather than a continuous stream of packets such that a network element sometimes receives a large number of packets in a short time period followed by a period of decreased activity wherein the network element receives no or few packets. Network elements often have at least one software queue for temporarily buffering data packets before the packets are fed to the appropriate transmit queues for transmission from the network element, and it is generally desirable for the network element to process the data packets quickly and efficiently such that the packets reach their destinations with little delay.

The software queue is often a shared resource that is accessed by multiple resources. To prevent data errors, access to the software queue is controlled by a mutual exclusion function (mutex) that serializes access to the software queue so that it may be accessed by only one resource at a time. Such serialized access causes contention within the network element as multiple resources vie for access to the software queue. It is possible for such contention to cause delays in the handling of at least some packets, but such delays are generally an acceptable trade-off for preventing errors that would otherwise occur if access to the software queue is not serialized. Nevertheless, techniques for reducing delays in a network element are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for reducing contention for a software queue in a network element. An exemplary network element comprises a processing system, a plurality of receivers, and at least one transmitter. Each receiver has a receive queue for receiving data packets, and each transmitter has a transmit queue for buffering data packets to be transmitted by the transmitter. The transmit queue of a particular transmitter and each of the receive queues are coupled to a software queue of the processing system, which executes a plurality of processing threads, referred to hereafter as "data path threads." Each data path thread is associated with a respective receive queue and pulls packets from the associated receive queue for pushing such packets to the software queue. Further, a transmit driver pulls packets from the software queue and pushes the packets to the transmit queue that is coupled to the software queue. A mutual exclusion function (mutex) controls which resource (e.g., data path thread) has access to the software queue at a given time.

The network element further comprises a processing thread, referred to as a "queue management thread," that is configured to determine whether any packets possibly remain in the software queue. If packets do possibly remain in the software queue, the queue management thread notifies (e.g., calls) the transmit driver so that it may move such packets to the transmit queue and/or ensure that the software queue is empty.

In one embodiment, this queue management thread is assigned a lower priority than the data path threads such that the queue management thread runs when there are no packets to be moved to the software queue. Thus, the function of checking the software queue for packets by the queue management thread is effectively postponed during data bursts so that contention for the software queue is reduced, thereby increasing the throughput of the network element during the data bursts. Between data bursts, when there are no packets to be forwarded to the software queue, the queue management thread is allowed to run in order to ensure that the software queue is empty so that data packets are not left in the software queue for extended time periods between data bursts.

In another embodiment, the queue management thread is assigned a higher priority than the data path threads. Each transmit driver asserts a corresponding flow indicator each time its transmit queue becomes full and deasserts the corresponding flow indicator when the software queue becomes empty. The queue management thread from time-to-time checks the flow indicator. If the flow indicator is asserted, the queue management thread accesses the software queue to ensure that it has been cleared of data packets. If the flow indicator is not asserted, then the queue management thread does not attempt to access the software queue. Thus, the queue management thread attempts to access the software queue only when packets possibly remain in the software queue based on polling of the flow indicator, thereby reducing contention for the software queue relative to embodiments that check the software when packets are transmitted from the transmitter.

Figure 1:
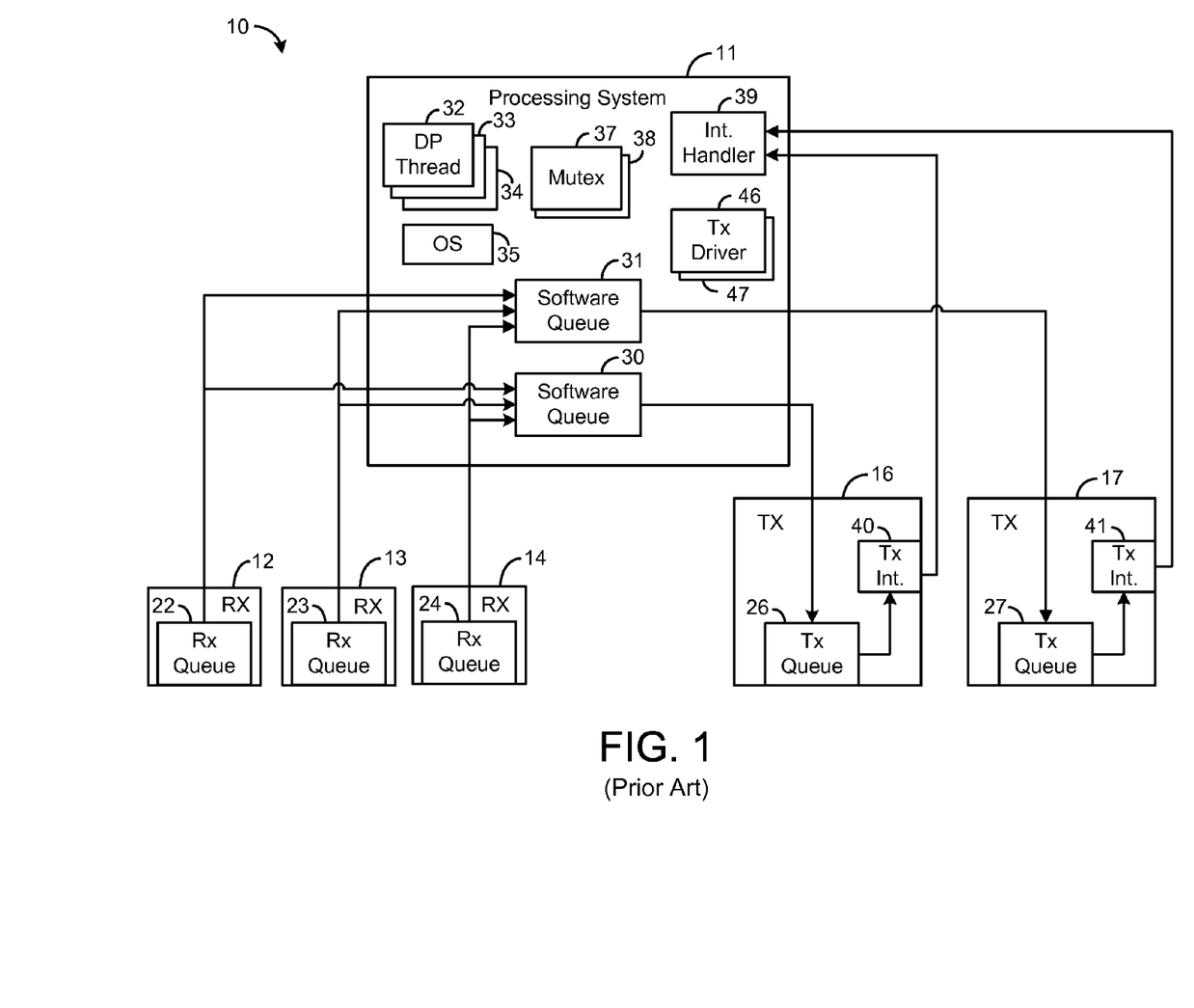
FIG. 1 is a block diagram illustrating a conventional network element.

FIG. 1 depicts a conventional network element 10, such as, for example, a gateway, a switch, a router, etc. The network element 10 comprises a processing system 11, such as digital signal processor (DSP), coupled to a plurality of receivers 12-14 and transmitters 16 and 17. As shown by FIG. 1, each receiver 12-14 comprises a respective receive (Rx) queue 22-24, and each transmitter 16 and 17 comprises a respective transmit (Tx) queue 26 and 27. Each receiver 12-14 is configured to receive data packets entering the network element 10 and to temporarily store the packets in its respective Rx queue 22-24 until the packets are to be processed, at which time the packets are sent to the processing system 11, as will be discussed in more detail hereafter. Each transmitter 16 and 17 is configured to receive packets from the processing system 11 and to buffer the packets in its respective Tx queue 26 and 27 prior to transmission from the transmitter 16 and 17. Note that the receivers 12-14 and the transmitters 16 and 17 are typically implemented in hardware, though it is possible for the receivers 12-14 and/or transmitters 16 and 17 to include software and/or firmware. Furthermore, although FIG. 1 depicts three receivers 12-14 and two transmitters 16 and 17 for illustrative purposes, any number of receivers 12-14 and transmitters 16 and 17 are possible.

The processing system 11 comprises at least one software queue 30 and 31 configured to buffer data packets received from the Rx queues 22-24. Each software queue 30 and 31 is coupled to each of the receivers 12-14 and a respective transmitter 16 and 17, and each software queue 30 and 31 is configured to buffer packets to be forwarded to the respective transmitter 16 and 17 that is coupled to it. In a multi-core network element 10, the processing system 11 further comprises a plurality of threads of execution 32-34, also referred to as "processing threads." Each processing thread 32-34, which will be referred to hereafter as a "data path (DP) thread," corresponds to a respective Rx queue 22-24 and processes the packets in such Rx queue 22-24 by moving the packets to at least one software queue 30 and 31, as will be described in more detail hereafter. For illustrative purposes, it will be assumed that the data path thread 32 corresponds to receive queue 22, that the data path thread 33 corresponds to receive queue 23, and that the data path thread 34 corresponds to the receive queue 24.

Each data path thread 32-34 is configured to pull packets from its corresponding receive queue 22-24 and to push each such packet to the software queues 30 or 31 depending on which transmitter 16 or 17 is to transmit the packet. In this regard, packets to be transmitted by the transmitter 16 are pushed to the software queue 30 that is coupled to such transmitter 16, and packets to be transmitted by the transmitter 17 are pushed to the software queue 31 that is coupled to such transmitter 17. Thus, each software queue 30 or 31 is a resource shared by all of the data path threads 32-34 and a respective one of the transmitters 16 or 17. To help prevent data errors due to sharing of the software queues 30 or 31 between the data path threads 32-34, access to each software queue 30 or 31 is preferably controlled such that only one resource (e.g., one of the data path threads 32-34) has access to the software queue 30 or 31 at a given time, as will be described in more detail below. That is, access to a given software queue is serialized such that only one data path thread 32-34 at a time pushes packets from its respective receive queue 22-24 to the software queue. Thus, data collisions and other types of errors in the software queues 30 or 31 are prevented.

Note that execution of the processing threads within the system 11, including the data path threads 32-34, is generally controlled by an operating system (OS) 35. In one exemplary architecture, the OS 35 prioritizes resources, such as processing threads, within the system 11 and selects a processing thread for execution only when all higher priority resources have completed execution. Once invoked, a processing thread is allowed to run until it completes execution or until a higher priority resource is ready to begin execution. Note that interrupts are assigned a higher priority than the data path threads 32-34 so that, if an interrupt occurs, execution of any of the data path threads 32-34 will be stopped so that the interrupt can be handled. It is possible for any of the data path threads 32-34 to be prioritized higher than the other data path threads.

As shown by FIG. 1, the processing system 11 has a plurality of transmit (Tx) drivers 46 and 47 respectively associated with the transmit queues 26 and 27 and the software queues 30 and 31. The transmit driver 46 is associated with the software queue 30 and the transmit queue 26 and is configured to move packets from the software queue 30 to the transmit queue 26, as will be described in more detail below. Further, the transmit driver 47 is associated with the software queue 31 and the transmit queue 27 and is configured to move packets from the software queue 31 to the transmit queue 27.

The processing system 11 further comprises a mutual exclusion function (mutex) 37 for controlling access to the software queue 30 and a mutex 38 for controlling access to the software queue 31. For brevity of illustration, the mutex 37 will be described in more detail below, and it should be noted that the mutex 38 is similarly configured to control access to its respective software queue 31, though the operation of the mutex 38 will not be described in detail.

Before allowing a given data path thread 32-34 to access the software queue 30, the mutex 37 first locks the software queue such that the other resources (e.g., other data path threads) cannot access it. For example, if the receive queue 22 receives at least one packet to be forwarded to the software queue 30, the receiver 12 generates an interrupt that causes the corresponding data path thread 32 to run. In such case, the data path thread 32 requests access to the software queue 30 from the mutex 37 so that the thread 32 may begin moving packets from the receive queue 22 to the software queue 30. Before granting the thread's request, the mutex 37 first locks the software queue 30 by ensuring that the other resources, such as threads 33 and 34, do not have permission to access the software queue 30. Thus, when the thread 32 is permitted to push packets from the receive queue 22 to the software queue 30, the other threads 33 and 34 are prevented from pushing packets to the same software queue 30.

After the data path thread 32 has moved packets to the software queue 30, the data path thread 32 calls the transmit driver 46, which runs within the context and, hence, the priority level of the data path thread 32. When called, the transmit driver 46 requests access to the software queue 30 from the mutex 37. When the mutex 37 grants such access, the transmit driver 46 begins pulling packets one-by-one from the software queue 30 and pushing the packets to the associated Tx queue 26 until such Tx queue 26 is full or the software queue 30 is empty. Upon either condition, execution of the transmit driver 46 ends, and the mutex 37 releases the software queue 30 from the transmit driver's access such that another resource may access the software queue 30.

Note that it is possible for some data packets to remain in the software queue 30 after it has been released from the transmit driver 46 if the receivers 12-14 stop receiving packets to be forwarded to the software queue 30 before it is empty. In this regard, continuing with the example set forth above, if the Tx queue 26 becomes full before the software queue 30 is empty while the transmit driver 46 has access to the software queue 30, then the mutex 37 releases the software queue 30 to allow other resources to access it, but at least some packets (referred to hereafter as "remaining packets") pushed to the software queue 30 by the data path thread 32 may remain in the software queue 30. If at least one receiver 12-14 still has packets to be forwarded to the software queue 30, then at least one of the data path threads 32-34 will push packets to the software queue 30 and then call the transmit driver 46. In such case, the transmit driver 46 will request access to the software queue 30 and begin pulling the remaining packets from this queue 30 such that the remaining packets will not likely be left in the queue 30 for an extended time period. However, if the receivers 12-14 do not have packets to be forwarded to the software queue 30 and do not receive such packets for a prolonged period, then the remaining packets may stay in the software queue 30 for a relatively long time, such as until the next data burst at which point the transmit driver 46 will be called according to the techniques described above. Leaving packets in the software queue 30 for long time periods between data bursts is generally undesirable.

To prevent packets from being left in the software queue 30 for extended time periods between data bursts, a hardware interrupt (referred to hereafter as a "transmit interrupt") is generated by a transmit interface 40 each time the transmitter 16 transmits a data packet. Accordingly, when a transmit interrupt occurs, there is at least some space in the transmit queue 26 for receiving at least one packet from the software queue 30. The processing system 11 comprises an interrupt handler 39 that is responsive to the interrupt for calling the transmit driver 46, and the transmit driver 46 requests access to the software queue 30 from the mutex 37, and begins to move any packets remaining in the software queue 30 one-by-one to the transmit queue 26, which now has at least some availability. The transmit driver 46 continues moving packets to the Tx queue 26 until it is full or the software queue 30 is empty. Upon either condition, the mutex 37 releases the software queue 30 such that another resource (e.g., a data path thread 32-34) may access the software queue 30.

Note that similar techniques may be used by the mutex 38 to process packets in the software queue 31 and to ensure that packets are not left in the software queue 31 for prolonged periods between data bursts. Thus, the transmitter 17 has a transmit interface 41 for generating an interrupt when a packet is transmitted from the transmitter 17, as described above for the transmitter 16.

Use of the transmit interrupt ensures that packets are not left in the software queues 30 and 31 for extended time periods between data bursts but also adds contention for the software queues 30 and 31. That is, when the transmitter 16 generates an interrupt, for example, the transmit driver 46 requests access to the associated software queue 30 and prevents the data path threads 32-34 from accessing such software queue 30 during the interrupt. The contention reduces the speed at which the network element 10 can process received packets, and a significant increase in throughput has been observed by simply disabling the interrupt. However, disabling the interrupt often results in packets being left on the software queues 30 and 31 for relatively long periods of time between data bursts due to the lack of new incoming packets to effectively push the remaining packets from the software queues 30 and 31 to the Tx queues 26 and 27.

Figure 2:
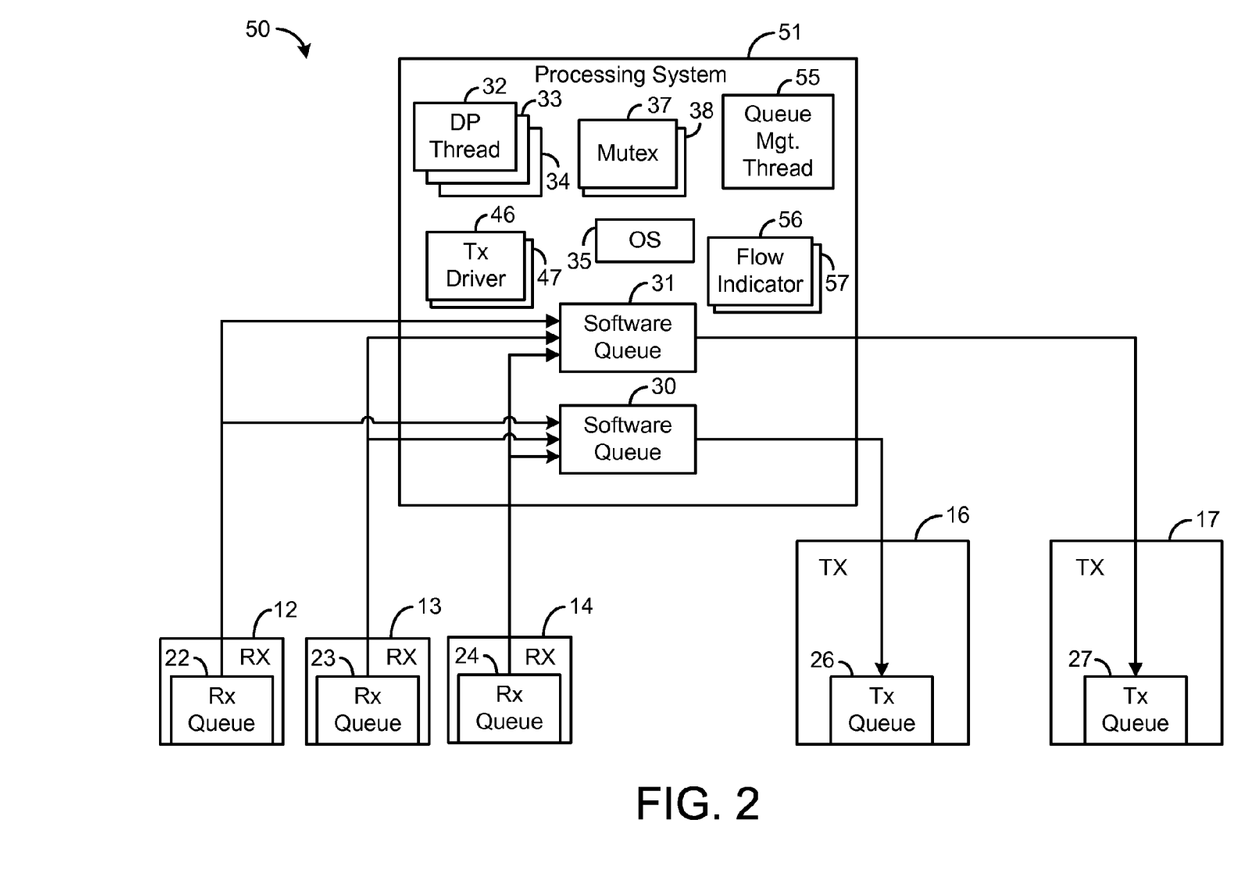
FIG. 2 is a block diagram illustrating an exemplary embodiment of a network element.

FIG. 2 depicts an exemplary network element 50, which comprises a processing system 51 coupled to a plurality of receivers 12-14 and at least one transmitter 16 and 17. The network element 50 also comprises a mutex 37 for controlling access to software queue 30 and a mutex 38 for controlling access to the software queue 31, as described above for the network element 10 of FIG. 1. Except as otherwise described hereafter, the network element 50 is configured the same as and operates the same as the conventional network element 10. However, rather than relying on a hardware interrupt to ensure that packets are not left in the software queues 30 and 31 for extended time periods, the network element 50 has a queue management (mgt.) thread 55 for performing a similar function, as will be described in more detail hereafter. The hardware interrupt discussed above for the conventional network element 10 of FIG. 1 may be disabled in the network element 50 of FIG. 2, or the network element 50 may be otherwise configured to not generate such interrupt. As an example, the transmit interface 40 of FIG. 1 may be omitted from the transmitters 16 and 17 of FIG. 2. For illustrative purposes, the functionality of the queue management thread 55 will be discussed hereafter in the context of software queue 30, but the queue management thread 55 is configured to use similar techniques to ensure that packets are not left in the software queue 31 for extended time periods.

In one exemplary embodiment, the queue management thread 55 is configured to determine whether packets remain in the software queue 30 and, if so, to cause the transmit driver 46 to move the remaining packets from the software queue 30 to the corresponding Tx queue 26 until the software queue 30 is empty or the Tx queue 26 is full. In this regard, if packets are determined to remain in the software queue 30, the queue management thread 55 calls the transmit driver 46, which then communicates with the mutex 37 in order to request access to the software queue 30. Once access to the software queue 30 is granted by the mutex 37, the transmit driver 46 begins moving packets from the software queue 30 to the transmit queue 26 until the software queue 30 is empty or the transmit queue 26 is full at which time execution of the transmit driver 46 ends and the mutex 37 releases the software queue 30 to that it can be accessed by other resources.

In addition, the queue management thread 55 is assigned a lower priority by the OS 35 than the data path threads 32-34. Thus, the queue management thread 55 only runs when the data path threads 32-34 have finished moving packets from the receive queues 22-24 to the software queue 30. That is, the OS 35 allows the queue management thread 55 to run when there are no packets in the receive queues 22-24 that are to be forwarded to the software queue 30. Therefore, during a data burst, execution of the queue management thread 55 is effectively delayed until after all of the packets of the data burst have been pushed into the software queue 30 and there are no more packets in any of the receive queues 22-24 to be forwarded to the software queue 30. Thus, the queue management thread 55 does not create any contention that slows the processing of the data burst thereby enhancing the network element's throughput for the data burst. That is, the queue management thread 55 is effectively disabled during a data burst and enabled at more convenient times between data bursts when the data path threads 32-34 do not need to access the software queue 30.

It should be noted that there are various techniques that may be used to determine whether packets remain in the software queue 30. In one exemplary embodiment, the queue management thread 55 makes such a determination based on flow indicators 56 and 57. Each such flow indicator 56 or 57 indicates whether a respective transmit queue 26 or 27 has become full and the associated software queue 30 or 31 still contains packets. Specifically, the flow indicator 56 indicates whether the transmit queue 26 has become full and the software queue 30 still contains packets, and the flow indicator 57 indicates whether the transmit queue 27 has become full and the software queue 31 still contains packets.

For example, one of the flow indicators 56 associated with the transmit queue 26 is initially deasserted (e.g., set to a logical low value), and such flow indicator 56 is not changed unless the associated transmit queue 26 becomes full. In this regard, as described above, when the transmit driver 46 has access to the software queue 30 and is moving packets from the software queue 30 to the transmit queue 26, the transmit driver 46 continues to pull packets from the software queue 30 until one of two conditions occurs: (1) the software queue 30 becomes empty or (2) the transmit queue 26 becomes full. At such point, execution of the transmit driver 46 ends, and the software queue 30 is released from access by such driver 46. Thus, if the software queue 30 is released due to condition (1), then no packets should remain in the software queue 30 at the time of release. In such case, the transmit driver 46 deasserts the flow indicator 56 associated with the transmit queue 26.

However, if the software queue 30 is released due to condition (2), then it is possible that packets remain in the software queue 30 at the time of release. When the transmit driver 46 determines that the transmit queue 26 is full (resulting in a release of the software queue 30), the transmit driver 46 is configured to assert (e.g., set to a logical high value) the flow indicator 56 associated with the transmit queue 26. In such example, the flow indicator 56 may be a one-bit value or flag, though other types of flow indicators 56 and 57 are possible in other embodiments.

Accordingly, the flow indicator 56 is asserted only if the transmit queue 26 has become full since the last time that the transmit driver 46 cleared the software queue 30. Thus, once the software queue 30 has been released from the transmit driver 46, it is possible for packets to remain in the software queue 30 only if the flow indicator 56 associated with the transmit queue 26 is asserted. Note that the flow indicator 57 is similarly controlled by the transmit driver 47 in order to indicate whether packets remain in the software queue 31.

In one exemplary embodiment, the queue management thread 55 is configured to poll the flow indicators 56 and 57 to determine which software queues 30 and 31 potentially have packets left in them. If a flow indicator 56 or 57 has been asserted, then the queue management thread 55 is aware that packets remain in the corresponding software queue and takes further action to ensure that such software queue is appropriately cleared so that packets do not remain in the software queue for extended time periods between data bursts.

For example, if the flow indicator 56 for the Tx queue 26 is deasserted when polled by the queue management thread 55, then the Tx queue 26 has not reached a full state since the last time that the software queue 30 was cleared by the transmit driver 46. In such case, the queue management thread 55 does not call the transmit driver 46 or otherwise attempt to clear the software queue 30 for the current poll since all of the packets entering the software queue 30 during the last data burst should have already been moved to the Tx queue 26. However, if the flow indicator 56 for the Tx queue 26 is asserted, then the queue management thread 55 is aware that the Tx queue 26 has become full at least once since the last time that the software queue 30 was cleared such that packets remain in the software queue 30. In such case, the queue management thread 55 calls the transmit driver 46, which requests access to the software queue 30 from the mutex 37 and then begins moving packets one-by-one from the software queue 30 to the transmit driver 26 until the software queue 30 is empty or the transmit queue 26 is full. Upon the occurrence of either event, execution of the transmit driver 46 ends, and the software queue 30 is released from access by the transmit driver 46, as described above.

Continuing with the foregoing example, if the software queue 30 is released due to the transmit queue 26 becoming full, then there is still at least one packet remaining in the software queue 30 at the time of release. Thus, the associated flow indicator 56 remains asserted after the software queue 30 is released from the transmit driver 46 such that the above-described process of the queue management thread 55 calling the transmit driver 46 for moving packets to the transmit queue 26 is repeated upon the next poll of the flow indicator 56. However, if the software queue 30 is released due to the software queue 30 becoming empty, then the transmit driver 46 deasserts the associated flow indicator 56. In such case, the queue management thread 55 will call the transmit driver 46 in the future only after the transmit queue 26 becomes full again such that the flow indicator 56 is asserted by the transmit driver 46.

Note that that the polling function described above could be particularly useful when there are a large number of transmitters. In this regard, if the queue management thread 55 is configured to call each transmit driver without first checking the flow indicators 56 and 57, then the process of ensuring that all of the software queues have been appropriately cleared would take considerably longer as each transmit driver would request access to the software queue from the mutex, and then access each software queue to ensure that it has been cleared. Polling of the flow indicators 56 and 57 allows the queue management thread 55 to quickly determine that at least some of the software queues do not need to be checked for remaining packets at any given time thereby reducing the number of times that transmit drivers attempt to access the software queues.

Further, it should also be noted that, in the foregoing example where the queue management thread 55 calls the transmit driver 46 when it is determined that packets possibly remain in the software queue 30, the transmit driver 46 runs within the context and, hence, the priority level of the queue management thread 55. Thus, if any of the receivers 12-14 receive packets when the transmit driver 46 is running in response to a call from the queue management thread 55, then the execution of the queue management thread 55 is interrupted thereby stopping execution of the transmit driver 46. Then, one of the data path threads 32-34 for processing the received packets is allowed to run. Thus, the functionality of the queue management thread 55 in checking the software queues for remaining packets should not significantly slow the throughput of the network element 50 in processing network traffic.

Figure 3:
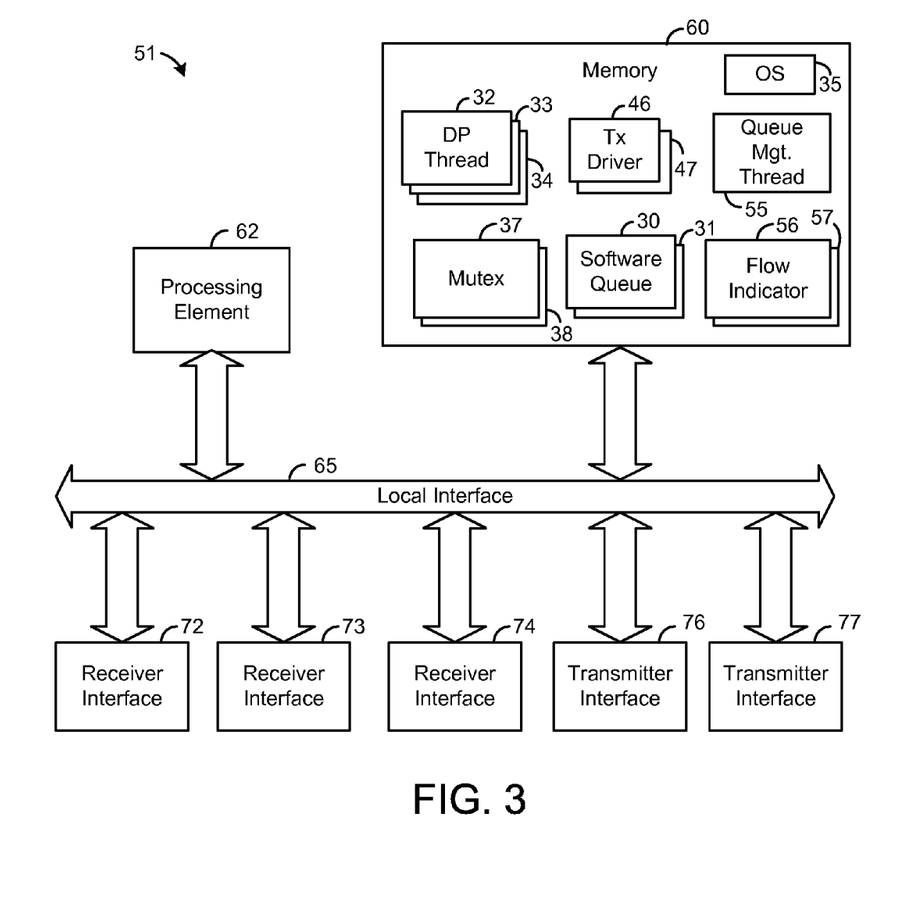
FIG. 3 is a block diagram illustrating an exemplary embodiment of a processing element, such as is depicted by FIG. 2.

FIG. 3 depicts an exemplary embodiment of the processing system 51 of FIG. 2. In the exemplary embodiment illustrated in FIG. 3, the queue management thread 55 is implemented in software and stored in memory 60 of the processing system 51 along with the data path threads 32-34, the mutexes 37 and 38, the software queues 30 and 31, the transmit drivers 46 and 47, and the flow indicators 56 and 57. In other embodiments, other implementations of the processing system 51 are possible.

Note that the queue management thread 55, data path threads 32-34, mutex 37, and transmit drivers 46 and 47, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary embodiment of the processing system 51 depicted by FIG. 3 comprises at least one conventional instruction processing element 62, such as a digital signal processor (DSP) or a central processing unit (CPU), that communicates to and drives the other elements within the system 51 via a local interface 65, which can include at least one bus. Furthermore, a plurality of receiver interfaces 72-74 can be coupled to the receivers 12-14 (FIG. 2), respectively, of the network element 50, and transmitter interfaces 76 and 77 can be coupled to the transmitters 16 and 17 (FIG. 2), respectively.

In one exemplary embodiment, assume that the network element 50 comprises three receivers 12-14 and two transmitters 16 and 17, as shown by FIG. 2. Further assume that the processing system 51 comprises three data path threads 32-34, wherein each data path thread corresponds to a respective receiver 12-14, and that the processing system 51 comprises two software queues 30 and 31, wherein each software queue 30 and 31 corresponds to a respective transmitter 16 and 17. Further assume that the software queues 30 and 31 and receive queues 22-24 are empty, and the flow indicators 56 and 57 are initially deasserted.

Now assume that the receiver 12 receives a data burst such that data packets are stored in the Rx queue 22. The data path thread 32 processes the packets and determines that the packets are to be forwarded to the software queue 30. Thus, the data path thread 32 contacts the mutex 37 in order to request access to the software queue 30 for moving packets from the receive queue 22 to the software queue 30. Before granting the request, the mutex 37 locks the software queue 30 such that no other resources (e.g., threads 33 and 34) may access the queue 30. In this regard, the mutex 37 ensures that no other resources currently have permission to access the software queue 30 before notifying the thread 32 that it may access such queue 30. Once the thread 32 receives notification that its request has been granted, the thread 32 pulls packets one-by-one from the receive queue 22 and pushes such pulled packets to the software queue 30. After pushing packets to the software queue 30, the thread 32 calls the transmit driver 46.

When invoked, the transmit driver 46 communicates with the mutex 37 to request access to the software queue 30. Before granting such access, the mutex 37 locks the software queue 30 by ensuring that no other resources have permission to access the software queue 30. At some point, after locking the software queue 30 from other resources, the mutex 37 notifies the transmit driver 46 that it is permitted to access the software queue 30. In response, the transmit driver 46 pulls the packets one-by-one from the software queue 30 and stores them in the Tx queue 26 until the Tx queue 26 is full or the software queue 30 is empty.

For illustrative purposes, assume that the Tx queue 26 becomes full before the software queue 30 is empty. Upon the occurrence of such condition, the transmit driver 46 notifies the mutex 37 that the software queue 30 may be released such that other resources (e.g., data path threads 32-34) may be granted access to the software queue 30. The transmit driver 46 also updates the flow indicator 56 that is associated with the transmit queue 26. Specifically, the transmit driver 46 asserts such indicator 56, thereby indicating that the transmit queue 26 has recently become full and there is at least one packet left in the software queue 30.

The queue management thread 55 is configured to periodically attempt to poll the flow indicators 56 and 57 in order to determine which software queues 30 and 31 have at least one packet left therein. However, if there are still packets in the receiver queues 22-24, such as may occur during a data burst, execution of the queue management thread 55 is delayed until there are no more packets remaining in the receive queues 22-24. An exemplary polling algorithm will be described below with reference to FIG. 4.

Figure 4:
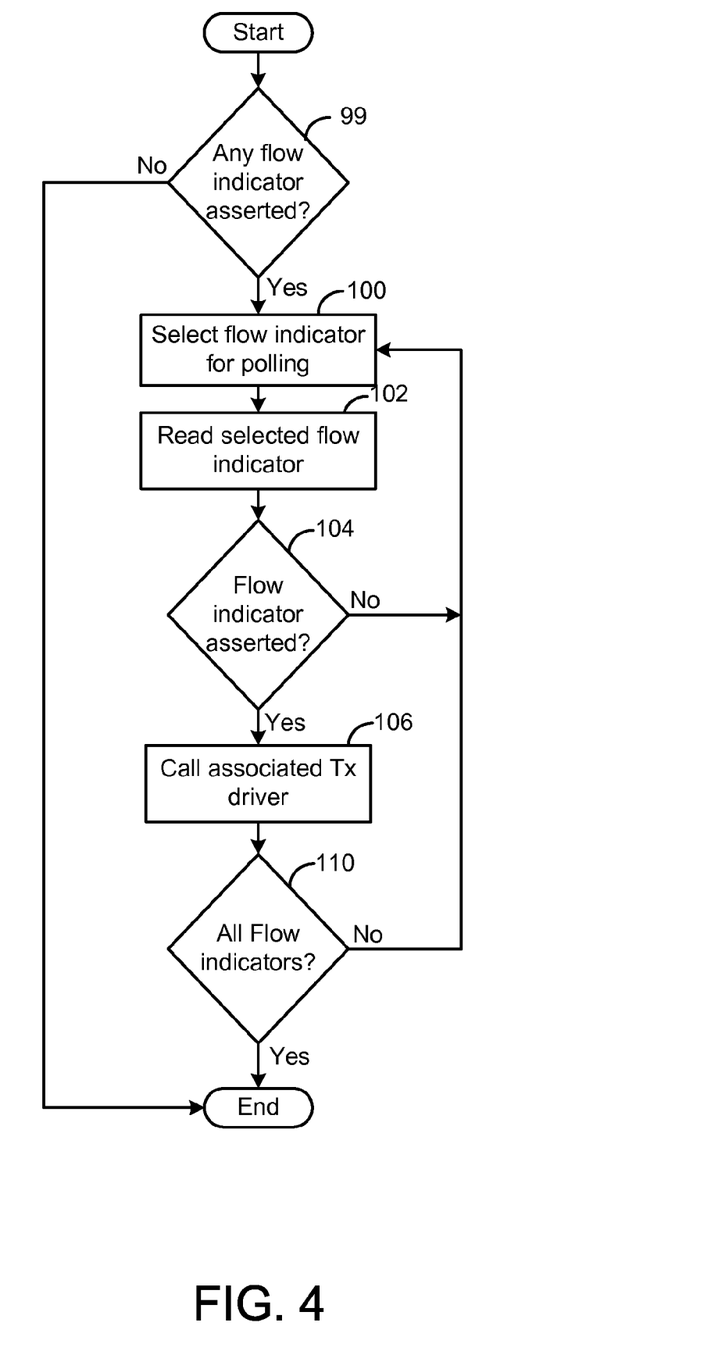
FIG. 4 is a flowchart illustrating an exemplary method for selectively calling a transmit driver for pulling data packets from a software queue, such as is depicted by FIG. 2.

In this regard, the queue management thread 55 analyzes the flow indicators 56 and 57 to determine whether any of them are asserted, thereby indicating that at least one packet remains in at least one of the software queues 30 or 31, as shown by block 99 of FIG. 4. If so, the queue management thread 55 selects a flow indicator 56 or 57 to be polled in block 100 of FIG. 4. For illustrative purposes, assume that the queue management thread 55 selects the flow indicator 56 associated with the transmit queue 26. As shown by blocks 102 and 104, the queue management thread 55 reads the selected flow indicator 56 and determines, based on such flow indicator 56, whether the associated transmit queue 26 has recently become full indicating that at least one packet remains in the corresponding software queue 30. In the instant case, the flow indictor 56 has been asserted by the transmit driver 46 indicating that there is at least one packet remaining in the software queue 30. Thus, the queue management thread 55 calls the transmit driver 46, as shown by block 106.

In response, the transmit driver 46 requests access to the software queue 30 from the mutex 37, which locks the software queue 30 so that other resources do not have permission to access it, and then the mutex 37 informs the transmit driver 46 that it is now permitted to access the software queue 30. In response, the transmit driver 46 pulls packets one-by-one from the software queue 30 and pushes the packets to the transmit queue 26. After a packet is pulled from the software queue 30 and pushed to the Tx queue 26, the transmit driver 46 determines whether the Tx queue 26 is now full. If so, the transmit driver 46 notifies the mutex 37 that the software queue 30 may be released from the control of the transmit driver 46. The transmit driver 46 also asserts the flow indicator 56 associated with the Tx queue 26, and execution of the transmit driver 46 ends. Thus, the next time that such flow indicator 56 is polled, the queue management thread 55 will make a "yes" determination in block 104 and call the transmit driver 46.

However, if the software queue 30 becomes empty after a packet is pulled from the software queue 30 by the transmit driver 46, then the transmit driver 46 also notifies the mutex 37 that the software queue 30 may be released from the control of the transmit driver 46. The transmit driver 46 then deasserts the flow indicator 56 associated with the Tx queue 26, and execution of the transmit driver 46 ends. Thus, for future polls of such flow indicator 56, the queue management thread 55 will make a "yes" determination in block 104 only after the Tx queue 26 becomes full in the future.

Once execution of the transmit driver 46 ends due to either the Tx queue 26 becoming full or the software queue 30 becoming empty, the queue management thread 55 determines whether all of the flow indicators 56 and 57 have been checked in the current run of the queue management thread 55, as shown by block 110 of FIG. 4. If not, the queue management thread 55 returns to block 100 and selects another flow indicator 56 or 57. However, if all flow indicators have been checked, then execution of the queue management thread 55 ends. After a period of time has passed, execution of the queue management thread 55 will be attempted, though such attempt may be delayed based on the priority of the thread 55 depending on the states of higher priority processing threads, such as the data path threads 32-34.

In another exemplary embodiment, the network element 50 of FIG. 2 is configured to operate the same as described above except as will be otherwise described below. In this regard, the queue management thread 55 is prioritized higher than the data path threads 32-34. As the transmit driver 46 is pulling packets from the software queue 30 and pushing such packets to the transmit queue 26, the transmit driver 46 is configured to assert the flow indicator associated with the transmit queue 26 when the transmit queue 26 becomes full, as described above. The transmit driver 46 is also configured to deassert such flow indicator 56 when the software queue 30 becomes empty, as described above. Thus, similar to the embodiments described above, the flow indicator 56 is asserted only if the transmit queue 26 has become full since the last time that the transmit driver 46 cleared the software queue 30. Therefore, once the software queue 30 has been released from the transmit driver 46, it is possible for packets to remain in the software queue 30 only if the flow indicator 56 associated with the transmit queue 26 is asserted, as described above.

Further, the OS 35 is configured to periodically invoke the queue management thread 55, which in the instant embodiment has a higher priority than the data path threads 32-34. Thus, execution of the queue management thread 55 should not be delayed due to execution of any of the data path threads 32-34, and the queue management thread 55 may be called during a data burst. When invoked, the queue management thread 55 determines whether any of the flow indicators 56 or 57 are asserted. For any deasserted flow indicator 56 or 57, the associated software queue is not accessed, as described above with reference to FIG. 4. For any asserted flow indicator 56 or 57, the queue management thread 55 invokes the associated transmit driver 46 or 47, which accesses the associated software queue 30 or 31 and begins moving packets from such queue, as described above with reference to FIG. 4. Thus, during execution of the queue management thread 55, no attempt is made to access the software queues that are associated with deasserted flow indicators 56 or 57, thereby reducing contention for the software queues relative to the conventional network element 10 depicted by FIG. 1. An exemplary operation of the foregoing embodiment will now be described in more detail below.

For illustrative purposes, assume that the software queues 30 and 31 and receive queues 22-24 of FIG. 2 are empty, and the flow indicators 56 and 57 are initially deasserted. Further assume that the receiver 12 receives a data burst such that data packets are stored in the Rx queue 22. The data path thread 32 processes the packets and determines that the packets are to be forwarded to the software queue 30. Thus, the thread 32 contacts the mutex 37 in order to request access to the software queue 30 for moving packets from the receive queue 22 to the software queue 30. Before granting the request, the mutex 37 locks the software queue 30 such that no other resources (e.g., threads 33 and 34) may access the queue 30. Once the thread 32 receives notification that its request has been granted, the thread 32 pulls packets one-by-one from the receive queue 22 and pushes such pulled packets to the software queue 30. After pushing packets to the software queue 30, the thread 32 calls the transmit driver 46.

When invoked, the transmit driver 46 communicates with the mutex 37 to request access to the software queue 30. Before granting such access, the mutex 37 locks the software queue 30 by ensuring that no other resources have permission to access the software queue 30. At some point, after locking the software queue 30 from other resources, the mutex 37 notifies the transmit driver 46 that it is permitted to access the software queue 30. In response, the transmit driver 46 pulls the packets one-by-one from the software queue 30 and stores them in the Tx queue 26 until the Tx queue 26 is full or the software queue 30 is empty.

For illustrative purposes, assume that the Tx queue 26 becomes full before the software queue 30 is empty. Upon the occurrence of such condition, the transmit driver 46 notifies the mutex 37 that the software queue 30 may be released such that other resources (e.g., data path threads 32-34) may be granted access to the software queue 30. The transmit driver 46 also updates the flow indicator 56 that is associated with the transmit queue 26. Specifically, the transmit driver 46 asserts such indicator 56, thereby indicating that the transmit queue 26 has recently become full and there is at least one packet left in the software queue 30. Thus, once the software queue 30 is released, the associated flow indicator 56 is asserted.

Later, assume that the transmit driver 46 is again invoked while the associated flow indicator 56 is still asserted. If the software queue 30 becomes empty while the transmit driver 46 is moving packets from the software queue 30 to the transmit queue 26, then the transmit driver 46 deasserts the associated flow indicator 56 and then notifies the mutex 37 that the software queue 30 may be released, thereby indicating that there are no packets currently in the software queue 30.

When the queue management thread 55 is invoked, it performs the method depicted by FIG. 4. Thus, if the flow indicator 56 for the software queue 30 is asserted, then the queue management thread 55 calls the transmit driver 46, which contacts the mutex 37 to request access to the software queue 30. Once access is granted, the transmit driver 46 moves packets from the software queue 30 to the transmit queue 26 in the context of the queue management thread 55 until the transmit queue 26 is full or the software queue 30 is empty, as described above. However, if the flow indicator 56 for the software queue 30 is deasserted, then the queue management thread 55 does not call the transmit driver 46 and no request for accessing the software queue 30 is sent to the mutex 37 during the current run of the queue management thread 55. Thus, over time, contention for the software queues 30 and 31 is reduced relative to the conventional network element 10 shown by FIG. 1 since it can be ensured that packets are not left in the software queues 30 and 31 between data bursts without having to access a software queue 30 or 31 each time a packet is transmitted.

Now, therefore, the following is claimed:

1. A network element, comprising:
   a receiver having a receive queue for receiving data packets from a communication network;
   a transmitter having a transmit queue;
   a software queue coupled to the transmitter and the receiver;
   memory for storing a data path thread, a queue management thread, and a transmit driver; and
   a processing element for executing the data path thread, the queue management thread, and the transmit driver, the processing element coupled to the transmitter, the receiver, the software queue, and the memory, the data path thread configured to move the data packets from the receive queue to the software queue, the data path thread further configured to call the transmit driver after moving the data packets to the software queue, wherein the transmit driver is configured to pull the data packets from the software queue for insertion into the transmit queue for transmission by the transmitter until the software queue becomes empty or the transmit queue becomes full, wherein the transmit driver is configured to set a flow indicator to a first value in response to a determination that the software queue becomes empty while the transmit driver is pulling the data packets from software queue and to set the flow indicator to a second value in response to a determination that the transmit queue becomes full while the transmit driver is pulling the data packets from the software queue, and wherein the queue management thread is configured to call the transmit driver based on the flow indicator if the flow indicator is set to the second value.

2. The network element of claim 1, wherein the data path thread has a first priority, wherein the queue management thread has a second priority, and wherein the second priority is different than the first priority to ensure that execution of the queue management thread is delayed during a data burst until at least the data path thread has moved each data packet of the data burst from the receive queue to the software queue.

3. The network element of claim 1, further comprising a mutual exclusion function (mutex) for controlling access to the software queue, wherein the transmit driver is configured to request from the mutex access to the software queue.

4. The network element of claim 1, wherein at least one of the data packets remains in the software queue when the transmit driver sets the flow indicator to the second value, and wherein the queue management thread is configured to call the transmit driver based on the flow indicator if the flow indicator is set to the second value for causing the transmit driver to pull the at least one of the data packets from the software queue for insertion into the transmit queue.

5. The network element of claim 1, wherein the data path thread is configured to call the transmit driver in response to a data burst received by the receiver when the flow indicator is set to the first value.

6. A network element, comprising:
a receiver having a receive queue for receiving data packets from a communication network;
a transmitter having a transmit queue;
a software queue coupled to the receiver and the transmitter, the software queue for buffering the data packets between the receive queue and the transmit queue;
memory for storing a data path thread, a transmit driver, and a queue management thread; and
a processing element for executing the data path thread, the transmit driver, and the queue management thread, the processing element coupled to the receiver, the transmitter, the software queue, and the memory,
wherein the data path thread is configured to move the packets from the receive queue to the software queue, wherein the transmit driver is configured to move the data packets from the software queue to the transmit queue, wherein the queue management thread is configured to call the transmit driver, wherein execution of the data path thread and the queue management thread is prioritized by an operating system to ensure that execution of the queue management thread is delayed during a data burst for which the data path thread processes data packets of the data burst until at least an end of the data burst, and wherein the operating system is configured to control execution of the data path thread, the transmit driver, and the queue management thread.

7. The network element of claim 6, wherein the data path thread is configured to call the transmit driver.

8. The network element of claim 6, wherein the transmit driver is configured to set a flow indicator to a first value if the software queue becomes empty while the transmit driver is pulling data packets from the software queue, and wherein the transmit driver is configured to set the flow indicator to a second value if the transmit queue becomes full while the transmit driver is pulling data packets from the software queue.

9. The network element of claim 8, wherein the queue management thread is configured to poll a plurality of flow indicators.

10. The network element of claim 8, wherein the queue management thread is configured to call the transmit driver based on the flow indicator.

11. A method for use in a network element having at least one receiver and at least one transmitter, comprising:
receiving data packets from a communication network into a receive queue of the receiver;
moving the data packets from the receive queue to a software queue;
moving the data packets from the software queue to a transmit queue of the transmitter;
transmitting the data packets from the transmitter through a network;
setting a flow indicator associated with the software queue to a first value in response to a determination that the software queue is empty;
setting the flow indicator to a second value in response to a determination that the transmit queue is full;
controlling access to the software queue via a mutual exclusion function (mutex); and
requesting access to the software queue, based on the flow indicator, from the mutex if the flow indicator is set to the second value.

12. The method of claim 11, wherein the moving the data packets from the receive queue to the software queue is performed via a data path thread of the network element, wherein the moving the data packets from the software queue to the transmit queue is performed via a queue management thread of the network element, and wherein the method further comprises prioritizing execution of the data path thread and the queue management thread, wherein the prioritizing comprises ensuring that execution of the queue management thread is delayed during a data burst until at least the data path thread has moved each data packet of the data burst from the receive queue to the software queue.

13. The method of claim 11, wherein the moving the data packets from the software queue to the transmit queue is performed via a transmit driver of the network element, wherein the requesting is performed via the transmit driver, and wherein the method further comprises calling the transmit driver based on the flow indicator.

14. The method of claim 11, further comprising requesting access to the software queue from the mutex in response to a data burst received by the receiver when the flow indicator is set to the first value.

15. A method for use in a network element having at least one receiver and at least one transmitter, comprising:
receiving data packets into a receive queue of the receiver;
moving the data packets from the receive queue to a software queue via a data path thread of the network element;
moving, via a transmit driver of the network element, the data packets from the software queue to a transmit queue of the transmitter;
transmitting the data packets from the transmitter through a network;
calling the transmit driver via a queue management thread of the network element; and
prioritizing execution of the data path thread and the queue management thread, wherein the prioritizing comprises ensuring such that execution of the queue management thread is delayed during a data burst for which the data path thread processes data packets of the data burst until at least an end of the data burst.

16. The method of claim 15, further comprising calling the transmit driver via the data path thread.

17. The method of claim 15, further comprising setting a flow indicator based on whether the software queue becomes empty during the moving, via the transmit driver of the network element, the data packets from the software queue to the transmit queue.

18. The method of claim 17, further comprising polling the flow indicator via the queue management thread.

19. The method of claim 17, wherein the calling is based on the flow indicator.

\* \* \* \* \*